United States Patent
Kuksenkova et al.

(10) Patent No.: US 10,683,234 B2
(45) Date of Patent: Jun. 16, 2020

(54) METHODS OF MAKING ANTIMICROBIAL GLASS ARTICLES

(71) Applicant: CORNING INCORPORATED, Corning, NY (US)

(72) Inventors: Ekaterina Aleksandrovna Kuksenkova, Painted Post, NY (US); Sumalee Likitvanichkul, Painted Post, NY (US); Santona Pal, Painted Post, NY (US); Mehmet Derya Tetiker, San Francisco, CA (US)

(73) Assignee: CORNING INCORPORATED, Corning, NY (US)

( * ) Notice: Subject to any disclaimer, the term of this patent is extended or adjusted under 35 U.S.C. 154(b) by 573 days.

(21) Appl. No.: 15/305,150

(22) PCT Filed: Apr. 23, 2015

(86) PCT No.: PCT/US2015/027202
§ 371 (c)(1),
(2) Date: Oct. 19, 2016

(87) PCT Pub. No.: WO2015/164556
PCT Pub. Date: Oct. 29, 2015

(65) Prior Publication Data
US 2017/0036954 A1    Feb. 9, 2017

Related U.S. Application Data

(60) Provisional application No. 61/984,181, filed on Apr. 25, 2014.

(51) Int. Cl.
C03C 21/00    (2006.01)
A01N 59/00    (2006.01)
(Continued)

(52) U.S. Cl.
CPC ............ C03C 21/005 (2013.01); A01N 59/00 (2013.01); A01N 59/16 (2013.01); C03C 3/091 (2013.01);
(Continued)

(58) Field of Classification Search
CPC ...... C03C 21/005; C03C 4/18; C03C 2204/00; C03C 2204/02; A01N 59/16; A01N 59/00
See application file for complete search history.

(56) References Cited

U.S. PATENT DOCUMENTS 8,586,492 B2    11/2013    Barefoot et al.
8,969,226 B2    3/2015    Dejneka et al.
(Continued)

FOREIGN PATENT DOCUMENTS

CN    102939269 A    2/2013
CN    103068764 A    4/2013
(Continued)

OTHER PUBLICATIONS

English Translation of CN20158003437.7 Office Action dated Jun. 29, 2018; 6 Pages; Chinese Patent Office.
(Continued)

*Primary Examiner* — Joseph S Del Sole
*Assistant Examiner* — Mohamed K Ahmed Ali
(74) *Attorney, Agent, or Firm* — Kevin M. Johnson

(57) ABSTRACT

Described herein are various methods and manufacturing methods for making antimicrobial and strengthened, antimicrobial glass articles and substrates. The methods described herein generally include contacting the article with a $KNO_3$-containing molten salt bath set at about 380 C to about 460 C for about 30 minutes to about 24 hours to form a compressive stress layer that extends inward from a surface of the glass substrate to a first depth; and contacting the article comprising the compressive stress layer with a
(Continued)

AgNO$_3$-containing molten salt bath set at about 300° C. to about 400° C. for about 5 minutes to about 18 hours to form an antimicrobial region that extends inward from the surface of the glass substrate to a second depth. The methods also include poisoning at least the AgNO$_3$-containing molten salt bath and, in some cases, the KNO$_3$-containing molten salt bath. Poisoning components include Na$^+$ and Li$^+$ ions.

28 Claims, 4 Drawing Sheets

(51) Int. Cl.
*A01N 59/16* (2006.01)
*C03C 3/091* (2006.01)
*C03C 4/18* (2006.01)

(52) U.S. Cl.
CPC ............. *C03C 4/18* (2013.01); *C03C 21/002* (2013.01); *C03C 2204/00* (2013.01); *C03C 2204/02* (2013.01)

(56) References Cited

U.S. PATENT DOCUMENTS

| | | |
|---|---|---|
| 9,156,724 B2 | 10/2015 | Gross |
| 9,346,703 B2 | 5/2016 | Bookbinder et al. |
| 2010/0028607 A1 | 2/2010 | Lee et al. |
| 2012/0034435 A1* | 2/2012 | Borrelli .............. C03C 17/30 428/210 |
| 2012/0216565 A1* | 8/2012 | Allan .............. C03C 21/002 65/29.1 |
| 2013/0045375 A1 | 2/2013 | Gross |
| 2014/0072783 A1* | 3/2014 | Borrelli .............. C03C 17/30 428/210 |
| 2014/0106172 A1 | 4/2014 | Dejneka et al. |
| 2014/0370303 A1* | 12/2014 | Jin .............. C03C 21/005 428/426 |
| 2015/0147775 A1 | 5/2015 | Fiacco et al. |

FOREIGN PATENT DOCUMENTS

| | | |
|---|---|---|
| JP | 2011133800 A | 7/2011 |
| WO | 2012019067 | 2/2012 |
| WO | 2013130649 | 9/2013 |

OTHER PUBLICATIONS

International Search Report of the International Searching Authority; PCT/US2015/027202; dated Aug. 10, 2014; 4 Pages; European Patent Office.

English Translation of CN201580034337.7 Second Office Action dated Feb. 11, 2019, China Patent Office, 9 Pgs.

* cited by examiner

METHODS OF MAKING ANTIMICROBIAL GLASS ARTICLES

This application claims the benefit of priority under 35 U.S.C. § 119 of U.S. Provisional Application Ser. No. 61/984,181 filed on Apr. 25, 2014 the content of which is relied upon and incorporated herein by reference in its entirety.

BACKGROUND

The present disclosure relates generally to processes and manufacturing methods for making strengthened, antimicrobial glass articles.

Touch-activated or -interactive devices, such as screen surfaces (e.g., surfaces of electronic devices having user-interactive capabilities that are activated by touching specific portions of the surfaces), have become increasingly more prevalent. In general, these surfaces should exhibit high optical transmission, low haze, and high durability, among other features. As the extent to which the touch screen-based interactions between a user and a device increases, so too does the likelihood of the surface harboring microorganisms (e.g., bacteria, fungi, viruses, and the like) that can be transferred from user to user.

To minimize the presence of microbes on glass, so-called "antimicrobial" properties have been imparted to a variety of glass articles. These antimicrobial properties can be imparted by injecting silver ions ($Ag^+$) into the surface regions of these articles. Certain concentration levels of $Ag^+$ ions in the surface regions of these articles are required to obtain acceptable antimicrobial efficacy. On the other hand, silver (Ag) is particularly expensive and any waste associated with the processes employed to impart the $Ag^+$ ions can significantly increase the cost of these articles.

There accordingly remains a need for technologies and processes that provide strengthened, antimicrobial glass articles. Manufacturing methods to repeatedly make such articles without significant strength variability are also needed. In addition, robust manufacturing methods are needed to develop the antimicrobial properties in strengthened, glass articles, particularly given the high cost of Ag and the influence of Ag concentration on efficacy.

BRIEF SUMMARY

Described herein are various processes, methods and manufacturing methods for making antimicrobial and strengthened antimicrobial glass articles and substrates.

One type of method of making an antimicrobial glass article includes the steps: providing a glass substrate; contacting the glass substrate with a $KNO_3$-containing molten salt bath for about 30 minutes to about 24 hours to form a compressive stress layer, wherein the $KNO_3$-containing molten salt bath is set at a temperature of about 380° C. to about 460° C. and the compressive stress layer extends inward from a surface of the glass substrate to a first depth. The method also includes the steps: providing an $AgNO_3$-containing molten salt bath set at a temperature of about 300° C. to about 400° C.; poisoning the $AgNO_3$-containing molten salt bath; and contacting the glass substrate comprising the compressive stress layer with the poisoned $AgNO_3$-containing molten salt bath for about 5 minutes to about 18 hours to form an antimicrobial region, wherein the antimicrobial region extends inward from the surface of the glass substrate to a second depth.

Another type of method of making an antimicrobial glass article includes the steps: providing a glass substrate; contacting the glass substrate with a $KNO_3$-containing molten salt bath for about 30 minutes to about 24 hours to form a compressive stress layer, wherein the $KNO_3$-containing molten salt bath is set at a temperature of about 380° C. to about 460° C. and the compressive stress layer extends inward from a surface of the glass substrate to a first depth. The method also includes the steps: providing an $AgNO_3$-containing molten salt bath set at a temperature of about 300° C. to about 400° C.; poisoning the $AgNO_3$-containing and the $KNO_3$-containing molten salt baths; and contacting the glass substrate comprising the compressive stress layer with the poisoned $AgNO_3$-containing molten salt bath for about 5 minutes to about 18 hours to form an antimicrobial region, wherein the antimicrobial region extends inward from the surface of the glass substrate to a second depth.

In some implementations, the poisoning step is configured to minimize Ag consumption during the step of contacting the substrate with the $AgNO_3$-containing molten salt bath. In some embodiments, the Ag consumption is limited to 0.18 $g/ft^2$ or less, 0.17 $g/ft^2$ or less, 0.16 $g/ft^2$ or less, 0.15 $g/ft^2$ or less, 0.14 $g/ft^2$ or less, 0.13 $g/ft^2$ or less, 0.12 $g/ft^2$ or less, 0.11 $g/ft^2$ or less, 0.10 $g/ft^2$ or less, or even as low as 0.05 $g/ft^2$ or less.

The $AgNO_3$-containing molten salt bath can also be set from about 380° C. to about 400° C. in some implementations. Further, the $KNO_3$-containing molten salt bath can be set at a temperature of about 400° C. to about 420° C. The step of contacting the glass substrate comprising the compressive stress layer with the poisoned $AgNO_3$-containing molten salt bath can be conducted for about 30 minutes to about 90 minutes. In addition, the step of contacting the substrate with a $KNO_3$-containing molten salt bath can be conducted for about 4 hours to about 6 hours.

Poisoning components can include $Na^-$ and $Li^+$ ions. For example, the poisoning step can include poisoning the $AgNO_3$-containing molten salt bath with up to about 6% $NaNO_3$ by weight. Further, the $KNO_3$-containing molten salt can be poisoned. In some cases, the $KNO_3$-containing molten salt is poisoned with up to 10% $NaNO_3$ by weight.

A manufacturing method of making an antimicrobial glass article includes the steps: providing a first plurality of glass substrates; and contacting the first plurality of glass substrates with a poisoned $KNO_3$-containing molten salt bath for about 30 minutes to about 24 hours to form a compressive stress layer, wherein the $KNO_3$-containing molten salt bath is set at about 400° C. to about 420° C. and the compressive stress layer extends inward from a surface of the glass substrates to a first depth. The manufacturing method also includes the step of contacting the first plurality of the glass substrates comprising the compressive stress layer with a poisoned $AgNO_3$-containing molten salt bath for about 5 minutes to about 18 hours to form an antimicrobial region, wherein the $AgNO_3$-containing molten salt bath is set at about 380° C. to about 400° C. and the antimicrobial region extends inward from the surface of the glass substrates to a second depth. The manufacturing method can also include providing a second plurality of glass substrates, wherein the contacting steps further comprise contacting the second plurality of glass substrates with the poisoned, $KNO_3$-containing and $AgNO_3$-containing molten salt baths after contacting the first plurality of glass substrates with the poisoned, $KNO_3$-containing and $AgNO_3$-containing molten salt baths.

The molten salt baths in these manufacturing methods can be poisoned to minimize Ag consumption during the step of contacting the substrates with the AgNO$_3$-containing molten salt bath. The baths employed in the manufacturing methods can include poisoning components derived from Na$^+$ and Li$^+$ ions. For example, the AgNO$_3$-containing molten salt bath can be poisoned with up to about 6% NaNO$_3$ by weight. Further, the KNO$_3$-containing molten salt bath can be poisoned. In some cases, the KNO$_3$-containing molten salt bath is poisoned with up to 10% NaNO$_3$ by weight. In some of these manufacturing methods, the Ag consumption is limited to 0.18 g/ft$^2$ or less, 0.17 g/ft$^2$ or less, 0.16 g/ft$^2$ or less, 0.15 g/ft$^2$ or less, 0.14 g/ft$^2$ or less, 0.13 g/ft$^2$ or less, 0.12 g/ft$^2$ or less, 0.11 g/ft$^2$ or less, 0.10 g/ft$^2$ or less, or even as low as 0.05 g/ft$^2$ or less.

In some implementations, the methods and manufacturing methods can also include forming an additional layer on at least a portion of the surface of the substrate (or substrates), wherein the additional layer comprises a reflection-resistant coating, a glare-resistant coating, a fingerprint-resistant coating, a smudge-resistant coating, a color-providing composition, an environmental barrier coating or an electrically conductive coating.

In some cases, the antimicrobial-containing region has an average thickness of less than or equal to about 10 μm. The antimicrobial-containing region can include Ag$^+$ ions derived from an AgNO$_3$-containing molten salt bath. In these cases, an Ag concentration at an outermost 50 nm of the antimicrobial-containing region can be up to about 45% by weight, based on a total weight of this outermost 50 nm of the antimicrobial-containing region.

The antimicrobial glass article may exhibit at least a 2 log reduction or at least about a 4 log reduction in a concentration of at least *Staphylococcus aureus, Enterobacter aerogenes*, and *Pseudomomas aeruginosa* bacteria under JIS Z 2801 (2000) testing conditions. In some cases, the antimicrobial glass article may exhibit at least a 3 log reduction in a concentration of at least *Staphylococcus aureus, Enterobacter aerogenes*, and *Pseudomomas aeruginosa* bacteria under modified JIS Z 2801 (2000) testing conditions, wherein the modified conditions comprise heating the antimicrobial glass article to a temperature of about 23 degrees Celsius to about 37 degrees Celsius at a humidity of about 38 percent to about 42 percent for about 24 hours followed by drying for about 6 hours to about 24 hours. In yet other embodiments, the antimicrobial glass article may exhibit at least a 2 log reduction in the concentration of at least *Staphylococcus aureus, Enterobacter aerogenes*, and *Pseudomomas aeruginosa* bacteria under a Dry Test.

It is to be understood that both the foregoing brief summary and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1:
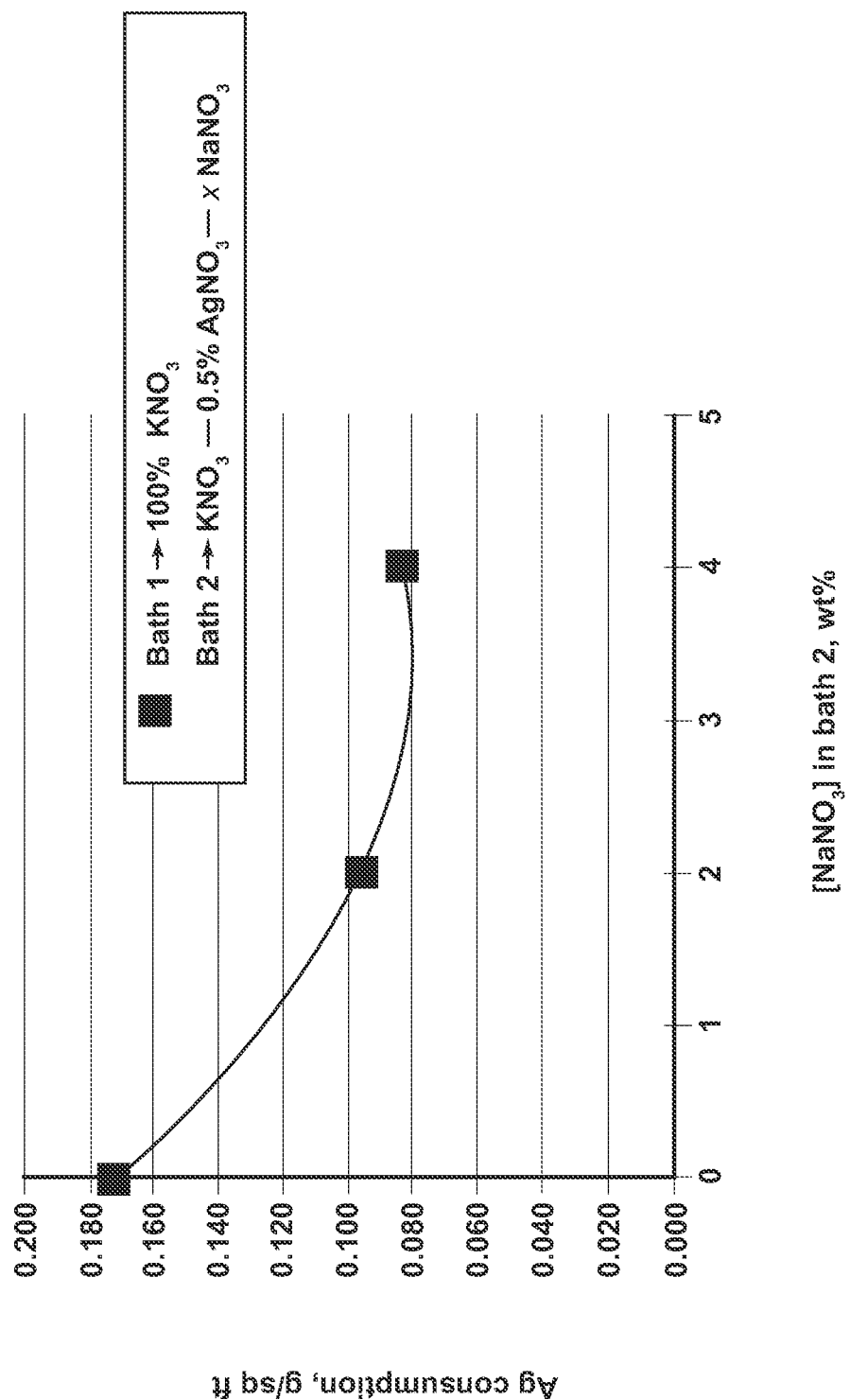
FIG. 1 is a plot of Ag consumption for an ion-exchange strengthened glass substrate immersed in an antimicrobial-containing molten salt bath as a function of sodium nitrate concentration in the antimicrobial-containing bath according to one embodiment.

Referring now to the figures, wherein like reference numerals represent like parts throughout the several views, exemplary embodiments will be described in detail. Throughout this description, various components may be identified having specific values or parameters. These items, however, are provided as being exemplary of the present disclosure. Indeed, the exemplary embodiments do not limit the various aspects and concepts, as many comparable parameters, sizes, ranges, and/or values may be implemented. Similarly, the terms "first," "second," "primary," "secondary," "top," "bottom," "distal," "proximal," and the like, do not denote any order, quantity, or importance, but rather are used to distinguish one element from another. Further, the terms "a," "an," and "the" do not denote a limitation of quantity, but rather denote the presence of "at least one" of the referenced item.

Described herein are various processes and manufacturing methods of making strengthened, antimicrobial glass articles. These processes and methods can be used to make antimicrobial glass articles with repeatable, enhanced strength and antimicrobial properties. In addition, these processes and manufacturing methods can be employed to develop the antimicrobial properties in the articles with minimal consumption of expensive antimicrobial ions, such as Ag$^+$ ions. The term "antimicrobial" refers herein to the ability to kill or inhibit the growth of more than one species of more than one type of microbe (e.g., bacteria, viruses, fungi, and the like).

The choice of glass used for the substrate is not limited to a particular composition. For example, the composition chosen can be any of a wide range of silicate, borosilicate, aluminosilicate or boroalumino silicate glass compositions, which optionally can comprise one or more alkali and/or alkaline earth modifiers.

By way of illustration, one family of compositions includes those having at least one of aluminum oxide or boron oxide and at least one of an alkali metal oxide or an alkali earth metal oxide, wherein—15 mol %≤(R$_2$O+R'O—Al$_2$O$_3$—ZrO$_2$)—B$_2$O$_3$≤4 mol %, where R can be Li, Na, K, Rb, and/or Cs, and R' can be Mg, Ca, Sr, and/or Ba. One subset of this family of compositions includes from about 62 mol % to about 70 mol % SiO$_2$; from 0 mol % to about 18 mol % Al$_2$O$_3$; from 0 mol % to about 10 mol % B$_2$O$_3$; from 0 mol % to about 15 mol % Li$_2$O; from 0 mol % to about 20 mol % Na$_2$O; from 0 mol % to about 18 mol % K$_2$O; from 0 mol % to about 17 mol % MgO; from 0 mol % to about 18 mol % CaO; and from 0 mol % to about 5 mol % ZrO$_2$. Such glasses are described more fully in U.S. patent application Ser. No. 12/277,573 by Matthew J. Dejneka et al., entitled "Glasses Having Improved Toughness And Scratch Resistance," filed Nov. 25, 2008, and claiming priority to U.S. Provisional Patent Application No. 61/004, 677, filed on Nov. 29, 2008, the contents of which are incorporated herein by reference in their entireties as if fully set forth below.

Another illustrative family of compositions includes those having at least 50 mol % $SiO_2$ and at least one modifier selected from the group consisting of alkali metal oxides and alkaline earth metal oxides, wherein [($Al_2O_3$(mol %)+$B_2O_3$ (mol %))/(Σ alkali metal modifiers (mol %))]>1. One subset of this family includes from 50 mol % to about 72 mol % $SiO_2$; from about 9 mol % to about 17 mol % $Al_2O_3$; from about 2 mol % to about 12 mol % $B_2O_3$; from about 8 mol % to about 16 mol % $Na_2O$; and from 0 mol % to about 4 mol % $K_2O$. Such glasses are described in more fully in U.S. patent application Ser. No. 12/858,490 by Kristen L. Barefoot et al., entitled "Crack And Scratch Resistant Glass and Enclosures Made Therefrom," filed Aug. 18, 2010, and claiming priority to U.S. Provisional Patent Application No. 61/235,767, filed on Aug. 21, 2009, the contents of which are incorporated herein by reference in their entireties as if fully set forth below.

Yet another illustrative family of compositions includes those having $SiO_2$, $Al_2O_3$, $P_2O_5$, and at least one alkali metal oxide ($R_2O$), wherein 0.75≤[($P_2O_5$(mol %)+$R_2O$(mol %))/$M_2O_3$ (mol %)]≤1.2, where $M_2O_3$=$Al_2O_3$ +$B_2O_3$. One subset of this family of compositions includes from about 40 mol % to about 70 mol % $SiO2$; from 0 mol % to about 28 mol % $B_2O_3$; from 0 mol % to about 28 mol % $Al_2O_3$; from about 1 mol % to about 14 mol % $P_2O_5$; and from about 12 mol % to about 16 mol % $R_2O$. Another subset of this family of compositions includes from about 40 mol % to about 64 mol % $SiO_2$; from 0 mol % to about 8 mol % $B_2O_3$; from about 16 mol % to about 28 mol % $Al_2O_3$; from about 2 mol % to about 12 mol % $P_2O_5$; and from about 12 mol % to about 16 mol % $R_2O$. Such glasses are described more fully in U.S. patent application Ser. No. 13/305,271 by Dana C. Bookbinder et al., entitled "Ion Exchangeable Glass with Deep Compressive Layer and High Damage Threshold," filed Nov. 28, 2011, and claiming priority to U.S. Provisional Patent Application No. 61/417,941, filed Nov. 30, 2010, the contents of which are incorporated herein by reference in their entireties as if fully set forth below.

Yet another illustrative family of compositions includes those having at least about 4 mol % $P_2O_5$, wherein ($M_2O_3$ (mol %)/$R_xO$(mol %))<1, wherein $M_2O_3$=$Al_2O_3$+$B_2O_3$, and wherein $R_xO$ is the sum of monovalent and divalent cation oxides present in the glass. The monovalent and divalent cation oxides can be selected from the group consisting of $Li_2O$, $Na_2O$, $K_2O$, $Rb_2O$, $Cs_2O$, MgO, CaO, SrO, BaO, and ZnO. One subset of this family of compositions includes glasses having 0 mol % $B_2O_3$. Such glasses are more fully described in U.S. Provisional Patent Application No. 61/560,434 by Timothy M. Gross, entitled "Ion Exchangeable Glass with High Crack Initiation Threshold," filed Nov. 16, 2011, the contents of which are incorporated herein by reference in their entirety as if fully set forth below.

Still another illustrative family of compositions includes those having $Al_2O_3$, $B_2O_3$, alkali metal oxides, and contains boron cations having threefold coordination. When ion exchanged, these glasses can have a Vickers crack initiation threshold of at least about 30 kilograms force ("kgf"). One subset of this family of compositions includes at least about 50 mol % $SiO_2$; at least about 10 mol % $R_2O$, wherein $R_2O$ comprises $Na_2O$; $Al_2O_3$, wherein—0.5 mol %≤$Al_2O_3$(mol %)–$R_2O$(mol %)≤2 mol %; and $B_2O_3$, and wherein $B_2O_3$ (mol %)–($R_2O$(mol %)–$Al_2O_3$(mol %))≥4.5 mol %. Another subset of this family of compositions includes at least about 50 mol % $SiO_2$, from about 9 mol % to about 22 mol % $Al_2O_3$; from about 4.5 mol % to about 10 mol % $B_2O_3$; from about 10 mol % to about 20 mol % $Na_2O$; from 0 mol % to about 5 mol % $K_2O$; at least about 0.1 mol % MgO and/or ZnO, wherein 0≤MgO+ZnO≤6 mol %; and, optionally, at least one of CaO, BaO, and SrO, wherein 0 mol %≤CaO+SrO+BaO≤2 mol %. Such glasses are more fully described in U.S. Provisional Patent Application No. 61/653,485 by Matthew J. Dejneka et al., entitled "Ion Exchangeable Glass with High Damage Resistance," filed May 31, 2012, the contents of which are incorporated herein by reference in their entirety as if fully set forth below.

In one or more embodiments, the glass substrate may include a low concentration of nonbridging oxygens (NBOs). As used herein, the term "nonbridging oxygens" is intended to refer to those oxygen atoms within the glass that bear a negative charge that can be compensated by a vicinal positively charged ion. For example, where silicon is bonded to four oxygen atoms and where the bond between the silicon atom and one of the oxygen atoms is broken, that oxygen atom bears a negative charge, which may be compensated by an alkali atom (e.g., Na). This is in contrast to those oxygen atoms within the glass that are covalently bonded to other atoms and do not bear a negative charge (such oxygen atoms being termed "bridging oxygens"). One way to determine the concentration of NBOs includes subtracting the sum of the concentrations, in mole percent (mol %), of all alkali metal oxides from the concentration, in mol %, of aluminum oxide. That is, NBO concentration is proportional to ($Al_2O_3$ (mol %)–(1 alkali metal oxides (mol %)). It is important to note that, because of this particular NBO concentration calculation, NBO concentration values can be negative. Thus, in some implementations of the glass articles, the concentration of NBOs may be less than zero. Where the difference $Al_2O_3$ (mol %)–(Σ alkali metal oxides (mol %)) equals zero or a positive number, then there are no NBOs present. Where the difference $Al_2O_3$ (mol %)–(Σ alkali metal oxides (mol %)) equals a negative number, that negative number indicates the presence of NBOs.

In one or more embodiments, the glass substrate may have a low concentration of NBOs, In general, the concentration of NBOs, as defined above, in the glass articles can be, in mol %, ≥to about −1, ≥to about −0.9, ≥to about −0.8, ≥to about −0.7, ≥to about −0.6, ≥to about −0.5, ≥to about −0.4, ≥to about −0.3, ≥to about −0.2, ≥to about −0.1, ≥to about 0, ≥to about 0.1, ≥to about 0.2, ≥to about 0.3, ≥to about 0.4, ≥to about 0.5, ≥to about 0.6, ≥to about 0.7, ≥to about 0.8, ≥to about 0.9≥to about 1. In some embodiments, the NBO concentration may be in the range from about −1 mol % to about 20 mol %, from about −1 mol % to about 15 mol %, from about −1 mol % to about 10 mol %, from about −1 mol % to about 5 mol %, from about −1 mol % to about 4 mol %, from about −1 mol % to about 3 mol %, from about −1 mol % to about 2 mol %, from about −1 mol % to about 1 mol %, from about −1 mol % to about 0.75 mol %, from about −1 mol % to about 0.5 mol %, from about −1 mol % to about 0.25 mol %, from about −1 mol % to about 0 mol %, from about −0.75 mol % to about 1 mol %, from about −0.5 mol % to about 1 mol %, from about −0.25 mol % to about 1 mol %, from about −0.25 mol % to about 0.25 mol % and all ranges and sub-ranges therebetween.

The glass substrate can adopt a variety of physical forms. That is, from a cross-sectional perspective, the substrate can be flat or planar, or it can be curved and/or sharply-bent. Similarly, it can be a single unitary object, a multi-layered structure or a laminate.

There is no particular limitation on the average thickness of the glass substrate. In many exemplary applications, however the average thickness may be less than or equal to about 15 mm If the antimicrobial glass article is to be used in applications where it may be desirable to optimize thickness for weight, cost, and strength characteristics (e.g., in electronic devices or the like), then even thinner substrates (e.g., less than or equal to about 5 mm) can be used. By way of example, if the antimicrobial glass article is intended to function as a cover for a touch screen display, then the substrate can exhibit an average thickness of about 0.02 mm to about 2.0 mm.

As such, the methods and processes disclosed herein to produce antimicrobial glass articles employ a glass substrate (in some cases a glass substrate with a low concentration of NBOs), a compressive stress layer or region that extends inward from a surface of the glass substrate to a first depth, and an antimicrobial-containing layer or region that extends inward from a surface of the glass substrate to a second depth. Throughout this specification, the term "compressive stress layer" shall be used to refer to the layer or region of compressive stress, and the term "antimicrobial-containing region" shall be used to refer to the layer or region containing the antimicrobial species, e.g., $Ag^+$ ions. This usage is for convenience only, and is not intended to provide a distinction between the terms "region" and "layer" in any way.

The compressive stress layer can be formed from a strengthening process (e.g., by thermal tempering, chemical ion-exchange, or like processes). The amount of compressive stress ("CS") and the depth of the compressive stress layer ("DOL") can be varied based on the particular use for the glass article, with the proviso that the CS and DOL should be limited such that a tensile stress created within the glass as a result of the compressive stress layer does not become so excessive as to render the glass article frangible.

While the ultimate limit on the CS and DOL is the avoidance of rendering the glass article frangible, the average DOL of the compressive stress layer generally may be less than about one-third of the thickness of the glass substrate. In most applications, however, the average DOL may be greater than or equal to about 25 µm and less than or equal to about 100 µm. Similarly, the average CS across the depth of the compressive stress layer generally may be between about 200 MPa and about 1.2 GPa. In most applications, the average CS may be greater than 400 MPa.

In addition, the glass substrate produced according to these methods and processes will include an antimicrobial-containing layer or region that extends inward from a surface of the glass substrate to a specific depth therein. The antimicrobial-containing region can comprise cationic monovalent silver ($Ag^+$) in an amount effective to impart antimicrobial behavior into the glass article. In general, the antimicrobial-containing region, like the compressive stress layer, extends inward from the surface of the glass substrate. Thus, the antimicrobial-containing region at least partially overlaps with the compressive stress layer. The depth of the antimicrobial-containing region ("DOR") will generally be limited so as to avoid visible coloration in the glass article and to maximize the antimicrobial efficacy of the antimicrobial ions, e.g., cationic silver, within the glass substrate. The processes and methods disclose herein can also produce glass articles with an antimicrobial-containing DOR employing $Ag^+$ ions. In turn, the antimicrobial-containing DOR employing $Ag^+$ ions can be configured to minimize Ag consumption without detrimental effects to antimicrobial efficacy and/or mechanical properties of the glass substrate.

As stated above, the thickness of the antimicrobial-containing region should be limited so as to avoid visible coloration in the glass article and to maximize the antimicrobial efficacy of the cationic silver within the glass substrate. As with the DOL of the compressive stress layer, the average thickness of the antimicrobial silver-containing region generally may be less than about one-third of the thickness of the glass substrate. The exact thickness, however, will vary depending on how the antimicrobial-containing region is formed.

For example, if the antimicrobial-containing region is formed before or after the compressive stress layer, and both are formed via chemical ion exchange, then the average thickness of the antimicrobial-containing region generally may be less than or equal to about 10 µm. In many such cases, the average thickness of the antimicrobial-containing region may be less than or equal to about 5 µm. Within this region, silver concentrations at the outermost portion of this region (which includes about the outermost 50 nm) of up to about 45 wt %, based on the total weight of this portion of the region, can be attained.

In contrast, if the antimicrobial-containing region is formed at the same time as the compressive stress layer, and both are formed via chemical ion exchange, then the average thickness of the antimicrobial silver-containing region generally may be greater than or equal to about 20 µm and less than or equal to about 350 µm. Within this region, silver concentrations at the outermost portion of this region (which includes about the outermost 50 nm) of up to about 5 wt %, based on the total weight of this portion of the region, can be attained.

In certain implementations of these processes and methods, the as-produced antimicrobial glass articles can include an additional layer disposed on the surface of the glass substrate. The optional additional layer(s) can be used to provide additional features to the antimicrobial glass article (e.g., reflection resistance or anti-reflection properties, glare resistance or anti-glare properties, fingerprint resistance or anti-fingerprint properties, smudge resistance or anti-smudge properties, color, opacity, environmental barrier protection, electronic functionality and/or the like). Materials that can be used to form the optional additional layer(s) generally are known to those skilled in the art to which this disclosure pertains.

When an optional additional layer is used, the average thickness of such a layer will depend on the function it serves. For example, if a glare- and/or reflection-resistant layer is implemented, the average thickness of such a layer should be less than or equal to about 200 nm. Coatings that have an average thickness greater than this could scatter light in such a manner that defeats the glare and/or reflection resistance properties. Similarly, if a fingerprint- and/or smudge-resistant layer is implemented, the average thickness of such a layer should be less than or equal to about 100 nm.

Methods of making the above-described articles generally include the steps of providing a glass substrate, forming a compressive stress layer that extends inward from a surface of the glass substrate to a first depth, and forming an antimicrobial-containing region that extends inward from the surface of the glass substrate to a second depth. In those embodiments where the optional additional layer is implemented, the methods generally involve an additional step of forming the additional layer on at least a portion of the surface of the substrate.

The selection of materials used in the glass substrates and optional additional layers can be made based on the particular application desired for the final glass article. In general, however, the specific materials may be chosen from those described above.

Provision of the glass substrate can involve selection of a glass object as-manufactured, or it can entail subjecting the as-manufactured glass object to a treatment in preparation for any of the subsequent steps. Examples of such treatments include physical or chemical cleaning, physical or chemical etching, physical or chemical polishing, annealing, shaping and/or the like.

Once the glass substrate has been selected and/or prepared, the compressive stress layer and/or the antimicrobial-containing region can be formed therein. That is, the compressive stress layer can be formed before, after, or simultaneously with the antimicrobial-containing region. Preferably, the compressive stress layer is formed before the antimicrobial-containing region.

Formation of the compressive stress layer can be accomplished in a variety of ways, including chemical ion exchange processes. In a chemical ion exchange ("IOX") process, the glass substrate is contacted with a molten salt bath (e.g., by dipping, immersing, spraying or the like), during which smaller cations in the outer or exterior region of the glass substrate are replaced by, or exchanged with, larger cations of the same valence (usually $1^+$) from the molten salt bath to place the outer or exterior region under compression, while an interior region of the glass (in which no ion exchange occurs) is put under tension. Conditions such as contacting time, molten salt bath temperature, and salt concentration in the molten salt bath can be tailored to achieve a desired DOL and CS in the compressive stress layer (the exterior region in which the ion exchange occurs).

Similarly, the antimicrobial-containing region can be formed in a variety of ways, of which chemical diffusion (which optionally can be accompanied by the exchange of another cation out from the glass) of cationic silver from a silver-containing medium (e.g., paste, dispersion, ion exchange bath of molten salts or the like) is the most common. In general, the glass substrate is contacted with the antimicrobial ion-containing medium. For example, the glass substrate can be contacted with a silver-containing medium (e.g., by dipping, immersing, spraying or the like), and cationic silver diffuses from the silver-containing medium into an outer or exterior region of the glass substrate. In most situations, however, the cationic silver replaces, or exchanges with, another cations of the same valence (i.e., $1^+$) from the silver-containing medium. Conditions such as contacting time, silver-containing medium temperature, and silver concentration in the silver-containing medium can be tailored to achieve a desired DOR and silver concentration in the silver-containing region (the exterior, antimicrobial-containing region in which the cationic silver diffuses or ion exchanges).

By way of example, one implementation of a method in which the compressive stress layer is formed before the antimicrobial-containing region entails immersing the glass article into a $KNO_3$-containing molten salt bath at a temperature of about 380° C. to about 460° C. for about 30 minutes to about 24 hours to impart the compressive stress via ion exchange, followed by immersing the strengthened glass article into an $AgNO_3$-containing molten salt bath at a temperature of about 300° C. to about 400° C. for about 5 minutes to about 18 hours to ion exchange $Ag^+$ ions into the glass article. According to one exemplary embodiment, a glass article is immersed in a $KNO_3$-containing molten salt bath at a temperature of about 400° C. to about 420° C. for about 4 to 6 hours to impart the compressive stress via ion exchange, followed by immersing the strengthened glass article into an $AgNO_3$-containing molten salt bath at a temperature of about 380° C. to about 400° C. for about 30 minutes to about 90 minutes to ion exchange $Ag^+$ ions into the glass. As used herein, such process implementations are examples of a "double ion exchange" ("DIOX") method.

In one or more embodiments, the $KNO_3$-containing molten salt bath can be formed entirely of $KNO_3$. In some embodiments, the $KNO_3$-containing molten salt bath can include $KNO_3$ as the only active component that undergoes ion exchange, as well as additional components that are inactive in the ion exchange process but aid, for example, in molten salt bath stability, pH control, viscosity control or the like. In some embodiments, the $KNO_3$-containing molten salt bath can include $KNO_3$ and a second or other active component that undergoes ion exchange, and it can optionally include additional components that are inactive in the ion exchange process but aid, for example, in molten salt bath stability, pH control, viscosity control or the like.

When the $KNO_3$-containing molten salt bath includes a second or other active component that undergoes ion exchange, the second active component can be a so-called "poisoning component" that is present in an amount up to about 10 weight percent (wt %) based on the total weight of the $KNO_3$-containing molten salt bath. In some embodiments the poisoning in the $KNO_3$-containing molten salt bath is limited to an upper limit of about 7% by weight. As used herein, the term "poisoning component" refers to a salt bath component having a cation (the "poisoning cation") that is both smaller than $K^+$ and that is identical to, or smaller than, the cation originally in the glass substrate that is replaced by, or exchanged with, $K^+$ during the formation of the compressive stress layer. Examples of poisoning components include $Na^+$ and $Li^-$ ions derived from $NaNO_3$ and $LiNO_3$ salts. These optional poisoning components can be intentionally added to the $KNO_3$-containing molten salt bath in salt form to enable the presence of the poisoning cation at the surface of the glass substrate after the compressive stress layer-forming step for which the $Ag^+$ will preferentially (i.e., relative to the $K^+$) ion exchange during the subsequent antimicrobial-containing region forming step. That is, the potential for $Ag^+$ for $K^+$ exchange during the subsequent antimicrobial-containing region forming step can be minimized by inclusion of the poisoning component in the $KNO_3$-containing molten salt bath of the compressive stress layer forming step because the $Ag^+$ will preferentially replace the poisoning cation.

In one or more embodiments, the $AgNO_3$-containing molten salt bath can be formed entirely of $AgNO_3$. In some embodiments, the $AgNO_3$-containing molten salt bath can include $AgNO_3$ as the only active component that undergoes ion exchange, as well as additional components that are inactive in the ion exchange process but aid, for example, in molten salt bath stability, pH control, viscosity control or the like. In some embodiments, the $AgNO_3$-containing molten salt bath can include $AgNO_3$ and a second or other active component that undergoes ion exchange, and it can optionally include additional components that are inactive in the ion exchange process but aid, for example, in molten salt bath stability, pH control, viscosity control or the like.

When the $AgNO_3$-containing molten salt bath includes a second or other active component that undergoes ion exchange, the second active component generally may be $KNO_3$, in a concentration of about 75 wt % to about 99.95 wt %, based on the total weight of the $AgNO_3$-containing molten salt bath. In certain situations, the $AgNO_3$-containing molten salt bath can further include the poisoning component as a third active component (in addition to $KNO_3$ and $AgNO_3$) in an amount that is less than the amount of $AgNO_3$ in the $AgNO_3$-containing molten salt bath and/or less than or equal to the amount of the poisoning component in the $KNO_3$-containing molten salt bath of the compressive stress layer-forming step. In some implementations of the methods and processes disclosed herein, the $AgNO_3$-containing molten salt bath has 0.1% to 1% $AgNO_3$ (by weight), 0% to 6% $NaNO_3$ (supplying $Na^+$ ions as a poisoning component), and a balance of $KNO_3$. In some embodiments, the poisoning in the $AgNO_3$-containing molten salt bath is limited to an upper limit of about 2.5% $NaNO_3$ by weight.

In addition, poisoning components can be derived from the glass articles themselves during immersion in the $KNO_3$-containing and/or $AgNO_3$-containing molten salt baths. For example, $Na^+$ and/or $Li^+$ ions can be derived from $Na_2O$ and $Li_2O$ present in the glass articles, as-fabricated. These poisoning component ions leach out during immersion of the glass articles in these molten salt baths, thus changing the chemistry and concentration of the baths during manufacturing.

According to some embodiments employing a DIOX process, the antimicrobial efficacy of antimicrobial glass articles can be largely dependent upon the concentration of $Ag^-$ ions exchanged into the glass articles during submersion in the $AgNO_3$-containing molten salt bath. At the same time, Ag consumption levels in the glass articles significantly affect overall manufacturing costs. In some instances, Ag consumption levels in the glass articles can affect the optical properties of the antimicrobial glass article. For example, without being bound by theory, it is believed that the increased amount of silver in the antimicrobial glass article, at deeper depths of the glass substrate, can cause discoloration because at least a portion of the silver cations can be reduced by electron donors in the glass (e.g., transition metals or NBOs). By reducing the diffusion of silver cations in the glass substrate, the propensity to discolor is reduced because silver reduction is minimized. Further, Ag consumption during DIOX processing does not necessarily correlate to the concentration of $Ag^+$ ions exchanged into the glass articles during submersion in the $AgNO_3$-containing molten salt bath. Both intentional poisoning, and poisoning from submersion of the glass articles, in either or both of the $KNO_3$-containing and $AgNO_3$-containing molten salt baths (e.g., from $Na^-$ ions), can affect the Ag consumption rate in these glass articles during manufacturing. As such, the level of poisoning (e.g., from $Na^+$ ions) in either or both of these molten salt baths can be used to control Ag consumption during manufacturing, and thus efficiently manage a significant production cost input.

By way of another example, one implementation of a method where the compressive stress layer is formed after the antimicrobial-containing region entails immersing the glass substrate into an $AgNO_3$-containing molten salt bath to ion exchange $Ag^-$ into the glass followed by immersing the Ag-containing glass into a $KNO_3$-containing molten salt bath to impart the compressive stress via ion exchange. The $AgNO_3$-containing molten salt bath and the $KNO_3$-containing molten salt bath can be formed as described above, with the exception of the use of the poisoning component for preferential ion exchange.

By way of still another example, one implementation of a method where the compressive stress layer and the antimicrobial-containing region are formed simultaneously entails immersing the glass into a molten salt bath comprising both $KNO_3$ and $AgNO_3$ to ion exchange $K^+$ and $Ag^+$ into the glass together.

In such implementations, the $KNO_3$- and $AgNO_3$-containing molten salt bath can be formed entirely of $KNO_3$ and $AgNO_3$; the $KNO_3$- and $AgNO_3$-containing molten salt bath can include $KNO_3$ and $AgNO_3$ as the only active components that undergo ion exchange, as well as additional components that are inactive in the ion exchange process but aid, for example, in molten salt bath stability, pH control, viscosity control or the like; or the $KNO_3$- and $AgNO_3$-containing molten salt bath can include $KNO_3$, $AgNO_3$, and a third or other active component (e.g., a poisoning component) that undergoes ion exchange, and it can optionally include additional components that are inactive in the ion exchange process but aid, for example, in molten salt bath stability, pH control, viscosity control or the like.

After the compressive stress layer and the antimicrobial-containing region are formed, if desired, the optional additional layer(s) can be disposed on the surface of the glass substrate. Depending on the materials chosen, these coatings can be formed using a variety of techniques. For example, the optional additional layer(s) can be fabricated independently using any of the variants of chemical vapor deposition ("CVD") (e.g., plasma-enhanced CVD, aerosol-assisted CVD, metal organic CVD and the like), any of the variants of physical vapor deposition ("PVD") (e.g., ion-assisted PVD, pulsed laser deposition, cathodic arc deposition, sputtering and the like), spray coating, spin-coating, dip-coating, inkjetting, sol-gel processing or the like. Such processes are known to those skilled in the art to which this disclosure pertains.

It should be noted that between any of the above-described steps, the glass substrate can undergo a treatment in preparation for any of the subsequent steps. As described above, examples of such treatments include physical or chemical cleaning, physical or chemical etching, physical or chemical polishing, annealing, shaping and/or the like.

Once the glass article is formed according to the processes and manufacturing methods described herein, it can be used in a variety of applications where the article will come into contact with undesirable microbes. These applications encompass touch-sensitive display screens or cover plates for various electronic devices (e.g., cellular phones, personal data assistants, computers, tablets, global positioning system navigation devices and the like), non-touch-sensitive components of electronic devices, surfaces of household appliances (e.g., refrigerators, microwave ovens, stovetops, oven, dishwashers, washers, dryers and the like), medical equipment, biological or medical packaging vessels, and vehicle components, just to name a few devices.

Given the breadth of potential uses for the improved antimicrobial glass articles described herein, it should be understood that the specific features or properties of a particular article will depend on the ultimate application therefor or use thereof The following description, however, will provide some general considerations.

In general, the optical transmittance of the antimicrobial glass article will depend on the type of materials chosen. For example, if a glass substrate is used without any pigments added thereto and/or any optional additional layers are sufficiently thin, the article can have a transparency over the entire visible spectrum of at least about 85%. In certain cases where the antimicrobial glass article is used in the construction of a touch screen for an electronic device, for example, the transparency of the antimicrobial glass article can be at least about 90% over the visible spectrum. In situations where the glass substrate comprises a pigment (or is not colorless by virtue of its material constituents) and/or any optional additional layers are sufficiently thick, the transparency can diminish, even to the point of being opaque across the visible spectrum. Thus, there is no particular limitation on the optical transmittance of the antimicrobial glass article itself Like transmittance, the haze of the antimicrobial glass article can be tailored to the particular application. As used herein, the terms "haze" and "transmission haze" refer to the percentage of transmitted light scattered outside an angular cone of ±4.0° in accordance with ASTM procedure D1003, the contents of which are incorporated herein by reference in their entirety as if fully set forth below. For an optically smooth surface, transmission haze is generally close to zero. In those situations when the antimicrobial glass article is used in the construction of a touch screen for an electronic device, the haze of the article can be less than or equal to about 5%.

Regardless of the application or use, the methods of making the antimicrobial glass articles described herein provide glass articles with improved discoloration resistance to harsh conditions relative to existing antimicrobial glass articles. As used herein, the term "harsh conditions" refer to elevated temperatures, high relative humidity, reactive environments, and/or the like. For example, these can include temperatures of greater than about 200° C., relative humidity of greater than 80%, reducing environments, oxidizing environments, and/or the like. Such harsh conditions can be generated during manufacture and/or ordinary use of the antimicrobial glass articles. By way of illustration of the former, harsh conditions can be generated during the formation of any optional additional layers disposed on the surface of the glass substrate (e.g., during polymerization of a fingerprint-and/or smudge-resistant coating on the surface of the glass substrate at elevated temperatures, during direct bonding of adhesives used to adhere the glass substrate to another device, during sputtering of a transparent electrode, during thermal curing of an ink layer, and/or the like), during any intermediate treatment steps (e.g., during plasma cleaning, during chemical etching, during annealing, during chemical cleaning, and/or the like), and/or during other process conditions. Thus, in certain implementations, the antimicrobial glass articles exhibit improved discoloration resistance relative to existing antimicrobial glass articles when exposed to any of the above conditions.

While discoloration resistance can appear to be a qualitative and potentially subjective characterization, there are a number of quantifiable indications of discoloration resistance, examples of which will now be described.

One quantifiable indication of this improved resistance to discoloration can be seen in the change in the optical transmittance that is observed over time. This change can be measured after the formation of the antimicrobial silver-containing region, before the glass article is exposed to any harsh conditions, and after the glass article is exposed to harsh conditions. In general, the optical transmittance of the glass articles described herein can be substantially similar both before and after exposure to harsh conditions. In certain implementations, the change in the transmittance of the glass articles described herein after exposure to harsh conditions can be about ±3%. In other implementations, the change in the transmittance of the glass articles described herein after exposure to harsh conditions can be about ±0.5%.

Another quantifiable indication of improved resistance to discoloration is the change in absorbance at about 430 nm, which corresponds to the plasmon resonance associated with the formation of metallic silver nanoparticles (from cationic silver species) in the glass substrate, over time. This change can be measured after the formation of the antimicrobial silver-containing region, before the glass article is exposed to any harsh conditions, and after the glass article is exposed to harsh conditions. In general, the absorbance at about 430 nm of the glass articles described herein can be substantially similar both before and after exposure to harsh conditions. In certain implementations, the change in the absorbance at about 430 nm of the glass articles described herein after exposure to harsh conditions can be about ±25%. In other implementations, the change in the transmittance of the glass articles described herein after exposure to harsh conditions can be about ±10%.

Yet another quantifiable indication of the improved resistance to discoloration is the change in haze that is observed over time. This change can be measured after the formation of the antimicrobial-containing region, before the glass article is exposed to any harsh conditions, and after the glass article is exposed to harsh conditions. In general, the overall haze of the glass articles described herein after exposure to harsh conditions can be substantially similar to the haze of the as-produced glass articles. In certain implementations, the change in the haze of the glass articles described herein after exposure to harsh conditions can be about ±5%. In other implementations, the change in the haze of the glass articles described herein after exposure to harsh conditions can be about ±2%.

Still another quantifiable indication of the improved resistance to discoloration is the change in CIE 1976 color space coordinates that is observed over time. This change can be measured after the formation of the antimicrobial-containing region, before the glass article is exposed to any harsh conditions, and after the glass article is exposed to harsh conditions. In general, the individual coordinates (i.e., $L^*$, $a^*$, and $b^*$) of the glass articles described herein after exposure to harsh conditions can be substantially similar to the individual coordinates of the as-produced glass articles. In certain implementations, the change in the $L^*$, $a^*$, and $b^*$ coordinates of the glass articles described herein after exposure to harsh conditions can be about ±0.2, ±0.1, and ±0.1, respectively. In other implementations, the change in the $L^*$, $a^*$, and $b^*$ coordinates of the glass articles described herein after exposure to harsh conditions can be about ±0.1, ±0.05, and ±0.05, respectively.

The antimicrobial activity and efficacy of the antimicrobial glass articles produced according to the methods and processes described herein can be quite high. The antimicrobial activity and efficacy can be measured in accordance with Japanese Industrial Standard JIS Z 2801 (2000), entitled "Antimicrobial Products—Test for Antimicrobial Activity and Efficacy," the contents of which are incorporated herein by reference in their entirety as if fully set forth below. Under the "wet" conditions of this test (i.e., about 37° C. and greater than 90% humidity for about 24 hours), the antimicrobial glass articles described herein can exhibit at least a 5 log reduction in the concentration (or a kill rate of 99.999%) of at least *Staphylococcus aureus, Enterobacter aerogenes*, and *Pseudomonas aeruginosa* bacteria. In certain implementations, the antimicrobial glass articles described herein can exhibit at least a 7 log reduction in the concentration of any bacteria to which it is exposed under these testing conditions.

In scenarios where the wet testing conditions of JIS Z 2801 (2000) do not reflect actual use conditions of the antimicrobial glass articles produced according to the methods described herein (e.g., when the glass articles are used in electronic devices or the like), the antimicrobial activity and efficacy can be measured using "drier" conditions. For example, the glass articles can be tested between about 23° C. and about 37° C. and at about 38% to about 42% humidity for about 24 hours. Specifically, 5 control samples and 5 test samples can be used, wherein each sample has a specific inoculum composition and volume applied thereto, with a sterile coverslip applied to the inoculated samples to ensure uniform spreading on a known surface area. The covered samples can be incubated under the conditions described above, dried for about 6 hours to about 24 hours, rinsed with a buffer solution, and enumerated by culturing on an agar plate, the last two steps of which are similar to the procedure employed in the JIS Z 2801 (2000) test. Using this test, the antimicrobial glass articles described herein can exhibit at least a 1 log reduction in the concentration (or a kill rate of 90%) of at least *Staphylococcus aureus* bacteria and at least a 2 log reduction in the concentration (or a kill rate of 99.99%) of at least *Enterobacter aerogenes*, and *Pseudomonas aeruginosa* bacteria. In certain implementations, the antimicrobial glass articles prepared according to the methods described herein can exhibit at least a 3 log reduction in the concentration of any bacteria to which it is exposed under these testing conditions.

In other scenarios where the wet testing conditions of JIS Z 2801 do not reflect actual use conditions of the antimicrobial glass articles described herein (e.g., when the glass articles are used in electronic devices, or the like), the antimicrobial activity and efficacy can be measured using "dry" conditions. These conditions described herein are collectively referred to herein as a "Dry Test". The antimicrobial glass articles may exhibit at least a 1 log reduction in the concentration (or a kill rate of 90%) or even at least a 2 log reduction in the concentration (or kill rate of 99%) of at least *Staphylococcus aureus, Enterobacter aerogenes*, and *Pseudomomas aeruginosa* bacteria when tested under the Dry Test, which is described in U.S. Provisional Patent Application No. 61/908,401, which is hereby incorporated by reference in its entirety as if fully set forth below.

EXAMPLES

Example 1

Antimicrobial glass articles according to Example 1 were prepared by providing glass substrates having the nominal composition of about 68 mol % $SiO_2$, 4 mol % $B_2O_3$, about 13 mol % $Al_2O_3$, about 14 mol % $Na_2O$, about 2 mol % MgO and about 0.1 mol % $SnO_2$. The glass substrates had a thickness of about 0.55 mm.

Each of the substrates was strengthened by an ion-exchange process by immersing the substrates in a 100% $KNO_3$-containing molten salt bath, having a temperature of about 410° C. for 5 hours. Following ion-exchange strengthening, the glass strengthened substrates were immersed in an $AgNO_3$-containing molten salt bath at 390° C. for 1 hour. The composition of $AgNO_3$-containing molten salt bath was $KNO_3$-0.5$AgNO_3$-x$NaNO_3$ (by weight %), where x is varied and plotted on the X-axis of FIG. 1. Ag consumption levels as a function of glass article surface area were measured by using conventional inductively coupled plasma ("ICP") analytical techniques to ascertain the quantity of Ag imparted into the tested glass articles. Referring to FIG. 1, a plot of Ag consumption for an ion-exchange strengthened glass substrate immersed in an antimicrobial-containing molten salt bath as a function of sodium nitrate concentration (from 0% to 4% by weight) in the antimicrobial-containing bath is depicted according to one embodiment.

As the results of FIG. 1 demonstrate, Ag consumption levels decrease as a function of increasing $NaNO_3$ content (e.g., Na ions as a poisoning component) in the $AgNO_3$-containing molten salt bath. At 0% $NaNO_3$ (by weight) in the $AgNO_3$-containing molten salt bath, the Ag consumption level approached 0.180 g/ft². At 4% $NaNO_3$, the Ag consumption level was measured at slightly above 0.080 g/ft². Advantageously, it is possible to reduce Ag consumption levels during immersion of glass articles in a $AgNO_3$-containing molten salt bath by the addition of a few percent of $NaNO_3$ to the $AgNO_3$-containing molten salt bath.

Figure 2:
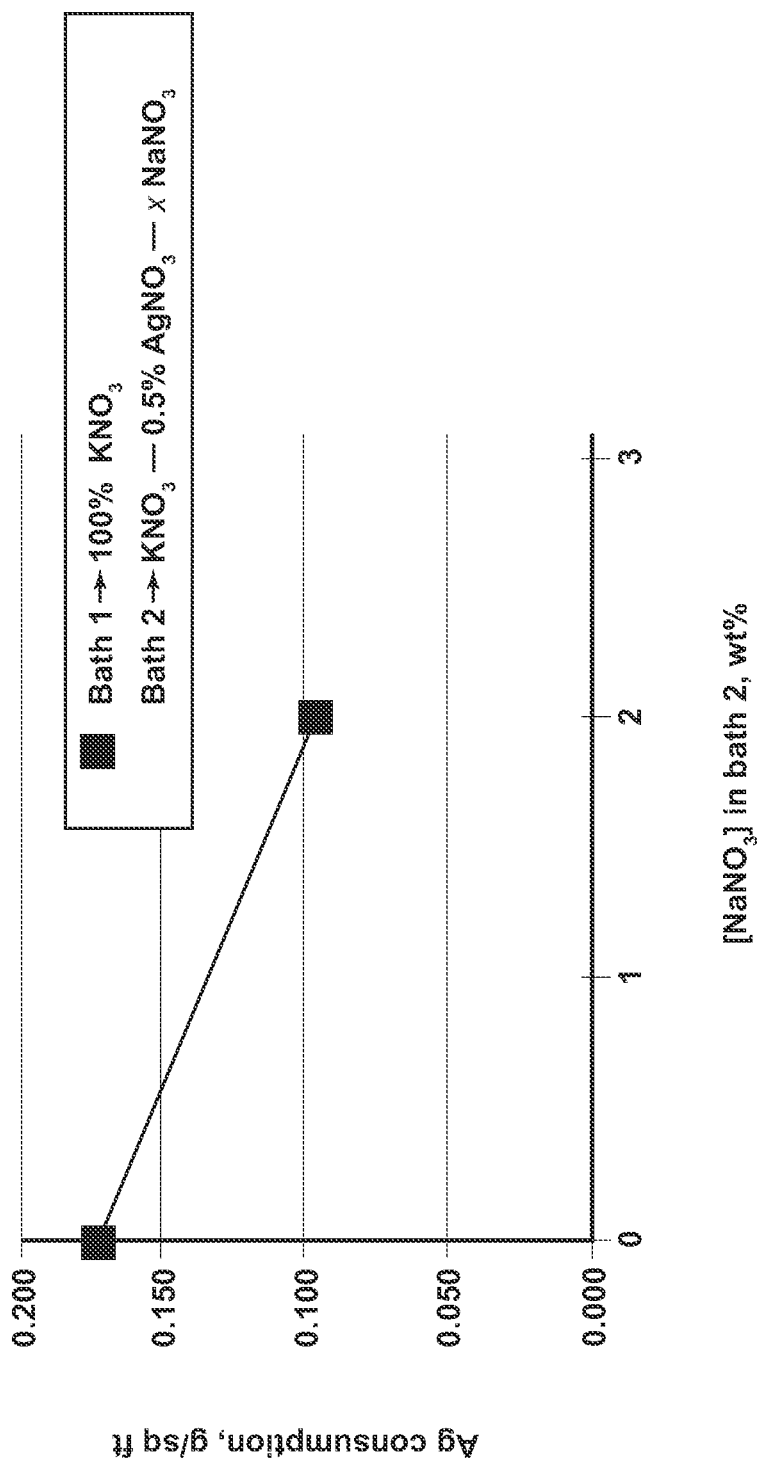
FIG. 2 is a plot of Ag consumption for the ion-exchange strengthened glass substrates of FIG. 1 as a function of sodium nitrate concentration.

FIG. 2 provides a plot of Ag consumption for the ion-exchange strengthened glass substrates of Example 1 as a function of $NaNO_3$ concentration from 0% to 2% by weight. As FIG. 2 demonstrates, the Ag consumption levels are particularly sensitive to the first few weight percent of $NaNO_3$. In particular, Ag consumption is reduced by 0.04 g/ft² per 1% by weight of $NaNO_3$ in the range of 0% to 2% by weight $NaNO_3$ in the $AgNO_3$-containing molten salt bath.

Example 2

Figure 3:
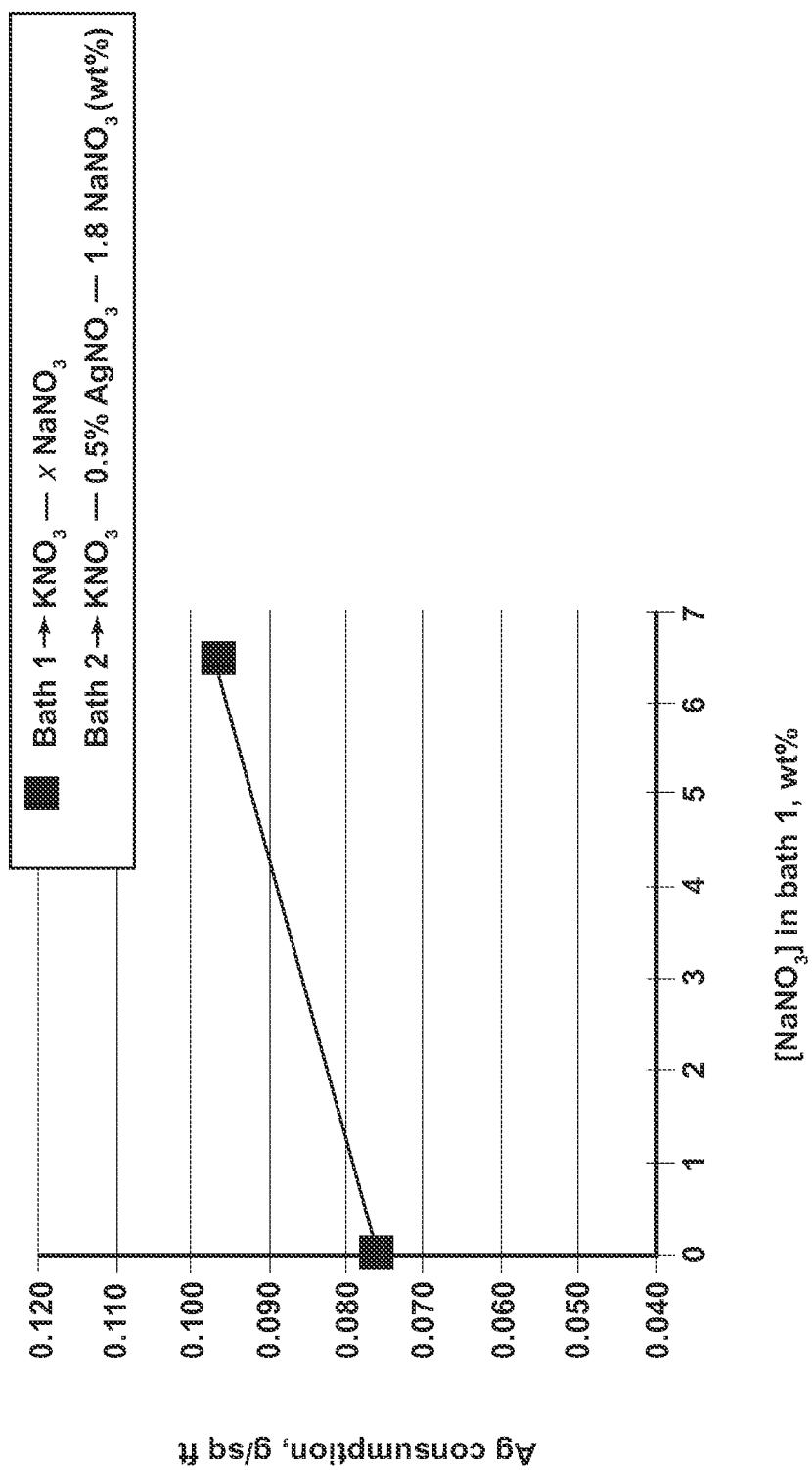
FIG. 3 is a plot of Ag consumption for an ion-exchange strengthened glass substrate immersed in an antimicrobial-containing molten salt bath as a function of sodium nitrate concentration in an ion-exchange strengthening bath according to another embodiment.

Referring to FIG. 3, a plot of Ag consumption for an ion-exchange strengthened glass substrate immersed in an antimicrobial-containing molten salt bath as a function of $NaNO_3$ concentration (from 0% to 6% by weight) in an ion-exchange strengthening bath is depicted according to another embodiment. The glass substrates employed to develop the data depicted in FIG. 3 had the same composition and thickness as the glass substrates used in Example 1.

The substrates were strengthened by ion exchange by immersing the substrates in a $KNO_3$-containing molten salt bath, having at temperature of about 410° C. for 5 hours. The composition of the $KNO_3$-containing molten salt bath was $KNO_3$-x$NaNO_3$ (by weight %), where x is varied and plotted on the X-axis of FIG. 3. Following ion-exchange strengthening, the strengthened glass substrates were immersed in an $AgNO_3$-containing molten salt bath at 390° C. for 1 hour. The composition of $AgNO_3$-containing molten salt bath was $KNO_3$-0.5$AgNO_3$-1.8$NaNO_3$ (by weight %). Ag consumption levels as a function of glass article surface area were measured by using conventional ICP analytical techniques to ascertain the quantity of Ag imparted into the tested glass articles.

As the results of FIG. 3 demonstrate, Ag consumption levels for ion exchange-strengthened glass articles increase as a function of increasing $NaNO_3$ content (e.g., $Na^+$ ions as a poisoning component) in the $KNO_3$-containing molten salt bath. At 0% $NaNO_3$ (by weight) in the $KNO_3$-containing molten salt bath, the Ag consumption level was slightly above 0.075 g/ft² during subsequent immersion in the $AgNO_3$-containing molten salt bath (i.e., at a fixed composition of $KNO_3$-0.5$AgNO_3$-1.8$NaNO_3$). At 6% $NaNO_3$ in the $KNO_3$-containing molten salt bath, the Ag consumption level measured during subsequent immersion in the $AgNO_3$-containing molten salt bath was higher, slightly above 0.095 g/ft². As such, Ag consumption levels during immersion of glass articles in a $AgNO_3$-containing molten salt bath increase in correlation to increased additions of $NaNO_3$ (e.g., $Na^+$ as a poisoning element) in the $KNO_3$-containing molten salt bath. According to FIG. 3, the Ag consumption increased at approximately 0.003 g/ft² per 1% by weight of $NaNO_3$ poisoning. As noted earlier, increases in $Na^+$ ion concentration in the $KNO_3$-containing molten salt bath can also be caused by $Na^+$ poisoning from the glass articles leached over time during manufacturing.

With regard to Ag consumption as depicted in FIGS. 1-3, the impact of Na⁺ poisoning in the KNO$_3$-containing molten salt bath is smaller compared to Na⁺ poisoning in the AgNO$_3$-containing molten salt bath per 1% by weight of NaNO$_3$ poisoning change. However, the range of poisoning allowed in the KNO$_3$-containing molten salt bath is much larger compared to the range of poisoning allowed in the AgNO$_3$-containing molten salt bath. This is because poisoning in the KNO$_3$-containing molten salt bath tends to result in retention of the strength enhancements obtained during immersion in the KNO$_3$-containing molten salt bath during subsequent antimicrobial bath immersion. Poisoning in the AgNO$_3$-containing molten salt bath, however, can reduce Ag consumption. The net effect is that poisoning at least one of the KNO$_3$-containing and AgNO$_3$-containing molten salt baths during the IOX processing and manufacturing methods of this disclosure can be employed such that Ag consumption, antimicrobial property development and strength retention are optimized in the glass articles.

Example 3

Antimicrobial glass articles according to Example 3 were prepared by providing glass substrates having the same composition and thickness as the glass substrates used in Example 1.

Each of the glass substrates was strengthened by ion-exchange by immersing the glass substrates in a KNO$_3$-containing molten salt bath having a temperature of about 410° C. for 5 hours. The composition of the KNO$_3$-containing molten salt bath was KNO$_3$-xNaNO$_3$ (by weight %), where x was varied for each of the samples corresponding to a particular Run No. in Table 1. Following ion-exchange strengthening, the strengthened glass substrates were immersed in an AgNO$_3$-containing molten salt bath at 390° C. for 1 hour. The composition of AgNO$_3$-containing molten salt bath was KNO$_3$-0.4 AgNO$_3$-xNaNO$_3$ (by weight %), where x was varied for each of the samples corresponding to a particular Run No. in Table 1. Ag consumption levels as a function of glass article surface area were measured in the DIOX-processed glass articles using conventional ICP analytical techniques. As demonstrated by Table 1 below, Ag consumption increases associated with poisoning (e.g., via Na⁺ ions derived from NaNO$_3$) in a KNO$_3$-containing molten salt bath can be balanced by poisoning in a subsequent AgNO$_3$-containing molten salt bath containing 3% by weight NaNO$_3$, 0.4% by weight AgNO$_3$, and a balance of KNO$_3$ (Run No. 4) exhibited 0.093 g/ft² Ag consumption levels. These Ag consumption levels were about 18% lower than the 0.113 g/ft² Ag consumption level measured for glass articles immersed in a non-poisoned, KNO$_3$-containing and AgNO$_3$-containing molten salt bath (Run No. 1). In addition, the conditions of Run No. 2, with no poisoning in the KNO$_3$-containing molten salt bath and poisoning in the AgNO$_3$-containing molten salt bath, exhibited low Ag consumption levels of 0.0761 g/ft². Hence, the data in Table 2 demonstrates that poisoning in the AgNO$_3$-containing molten salt bath significantly and advantageously reduces the Ag consumption rate.

Figure 4:
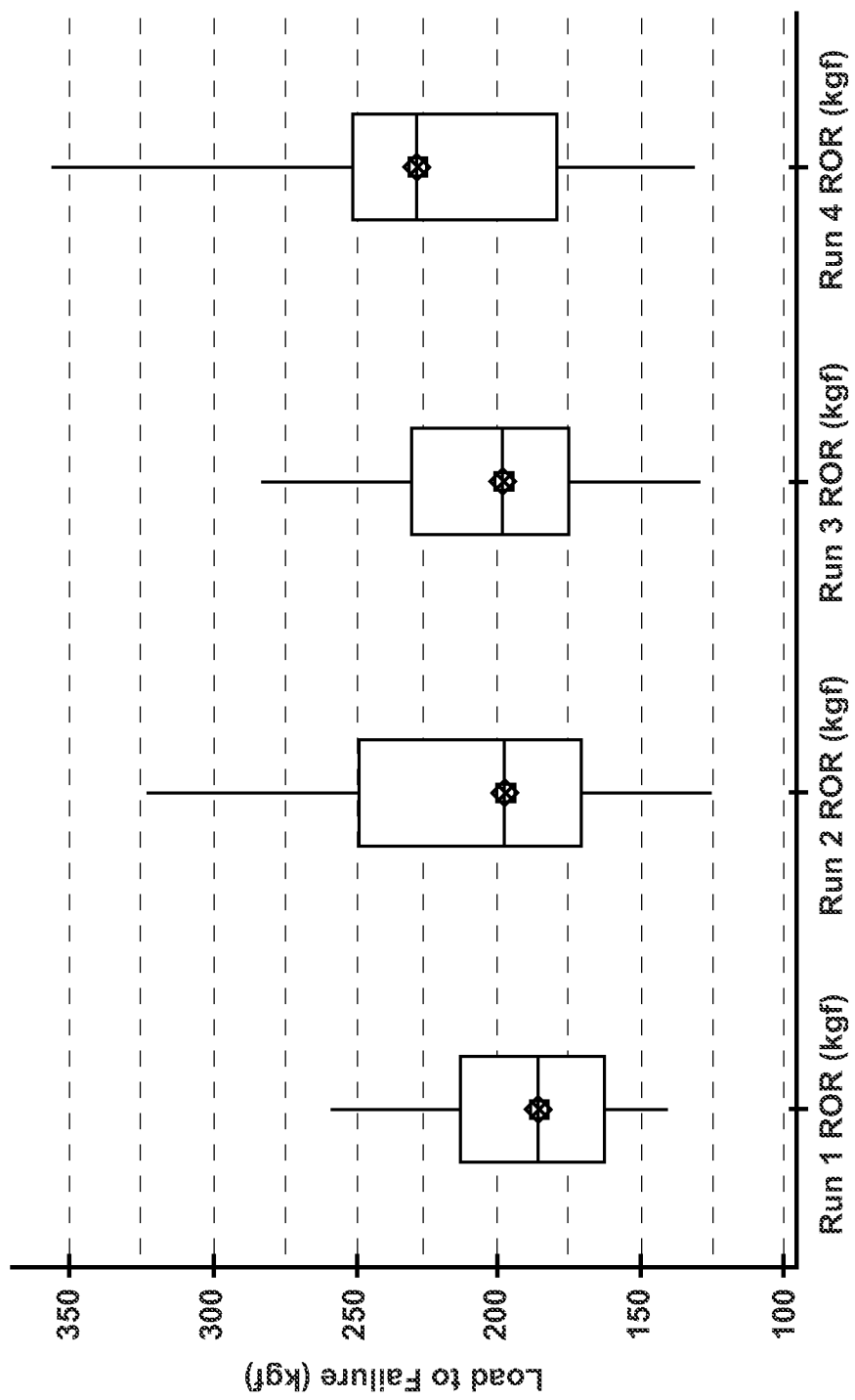
FIG. 4 is a box plot depicting the results of Ring-on-Ring ("ROR") testing of ion-exchange strengthened glass substrates immersed in an antimicrobial-containing molten salt bath according to an embodiment.

Referring to FIG. 4, a box is presented that depicts the results from ROR strength testing of the glass substrates processed according to Run Nos. 1-4 specified in connection with Table 1. The ROR tests were generally performed according to the ASTM C-1499-03 standard test method for Monotonic Equibiaxial Flexural Strength of Advanced Ceramics at Ambient Temperatures, with a few modifications to test fixtures and test conditions as outlined in U.S. Patent Publication No. 2013/0045375, at [0027], incorporated by reference herein. Note that the samples tested to generate the data depicted in FIG. 4 were not abraded prior to ROR testing.

As the results in FIG. 4 demonstrate, the groups of glass substrates identified as Run Nos. 1-4 each exhibit average load to failure values of at least 180 kgf. Further, there does not appear to be statistical difference in the average load to failure values for each of these groups. As such, poisoning in the AgNO$_3$-containing molten salt bath (i.e., in Run Nos. 2-4) does not lead to an appreciable drop in ROR as compared to the group of glass substrates without poisoning in the AgNO$_3$-containing molten salt bath (i.e., Run No. 1).

In Table 2 below, the CS and DOL values for the glass substrates according to each of the Run Nos. 1-4 are listed as measured after submersion in the KNO$_3$-containing molten salt bath and again after submersion in the AgNO$_3$-containing molten salt bath. The CS levels are generally less before and after immersion in the AgNO$_3$-containing molten salt bath for each of the Run Nos. For example, the average CS for the Run No. 1 group was 876 MPa before submersion in the AgNO$_3$-containing molten salt bath and 827 MPa afterward. DOL levels between the Run Nos. before and

TABLE 1

| Run No. | KNO$_3$-containing bath | | AgNO$_3$-containing bath | | | | Ag consumption (ICP) | |
|---|---|---|---|---|---|---|---|---|
| | NaNO$_3$ (wt %) | Time (hrs) | Temp (° C.) | AgNO$_3$ (wt %) | NaNO$_3$ (wt %) | Time (hrs) | Temp (° C.) | (wt %) | (g/ft²) |
| 1 | 0 | 5 | 410 | 0.4 | 0 | 1 | 390 | 0.092 | 0.1130 |
| 2 | 0 | 5 | 410 | 0.4 | 1.8 | 1 | 390 | 0.062 | 0.0761 |
| 3 | 6.5 | 5 | 410 | 0.4 | 1.8 | 1 | 390 | 0.079 | 0.0970 |
| 4 | 9.6 | 5 | 410 | 0.4 | 3 | 1 | 390 | 0.076 | 0.0933 |

Still referring to Table 1, the glass articles processed in a KNO$_3$-containing molten salt bath containing 6.5% by weight NaNO$_3$, and an AgNO$_3$-containing molten salt bath containing 1.8% by weight NaNO$_3$, 0.4% by weight AgNO$_3$, and a balance of KNO$_3$ (Run No. 3) exhibited 0.097 g/ft² Ag consumption levels. Similarly, glass articles processed in a KNO$_3$-containing molten salt bath containing 9.6% by weight NaNO$_3$, and an AgNO$_3$-containing molten salt bath after submersion in the AgNO$_3$-containing molten salt bath are generally constant and range from 34 to 37 μm.

Referring again to Table 2, the data also demonstrates the benefit of poisoning both the AgNO$_3$-containing and KNO$_3$-containing molten salt baths in terms of CS level. In Run No. 2, the KNO$_3$-containing molten salt bath was not poisoned and the AgNO$_3$-containing molten salt bath was poisoned. The CS level dropped from 876 MPa to 770 MPa as measured before and after submersion in the AgNO$_3$-containing molten salt bath. Apparently, the lack of poisoning in the KNO$_3$-containing molten salt bath was not able to counteract the slight loss in CS associated with the poisoning in the AgNO$_3$-containing molten salt bath.

On the other hand, the glass substrates submersed in a poisoned KNO$_3$-containing molten salt bath, followed by submersion in a poisoned AgNO$_3$-containing molten salt bath (i.e., Run Nos. 3-4), exhibited an increase in CS levels as measured before and after submersion in the AgNO$_3$-containing molten salt bath. In particular, the CS levels of the Run Nos. 3-4 groups (830 and 798 MPa, respectively) exceeded those measured for the Run No. 2 group (770 MPa) after submersion in the AgNO$_3$-containing molten salt bath. The poisoning in the KNO$_3$-containing molten salt bath may have left the glass substrates in the Run Nos. 3-4 groups in a condition such that Ag$^+$ ions preferentially replace Na$^+$ ions in the substrate (i.e., Na$^+$ ions incorporated into the substrate from the poisoning in the KNO$_3$-containing molten salt bath) during submersion in the AgNO$_3$-containing molten salt bath. In turn, appreciable quantities of K$^+$ ions in the AgNO$_3$-containing molten salt bath can further exchange into the substrate. These additional K$^+$ ions can lead to an increase in CS level. Hence, the data in Table 2 suggests that a balance in poisoning in both the AgNO$_3$-containing and KNO$_3$-containing molten salt baths may provide somewhat better CS level control compared to poisoning just the AgNO$_3$-containing molten salt baths.

TABLE 2

| | KNO$_3$-containing bath | | | Post KNO$_3$-containing bath properties | | AgNO$_3$-containing bath | | | | Post AgNO$_3$-containing bath properties | |
|---|---|---|---|---|---|---|---|---|---|---|---|
| Run No. | NaNO$_3$ (wt %) | Time (hrs) | Temp (° C.) | CS (MPa) | DOL (μm) | AgNO$_3$ (wt %) | NaNO$_3$ (wt %) | Time (hrs) | Temp (° C.) | CS (MPa) | DOL (μm) |
| 1 | 0 | 5 | 410 | 876 | 37 | 0.4 | 0 | 1 | 390 | 827 | 37 |
| 2 | 0 | 5 | 410 | 876 | 37 | 0.4 | 1.8 | 1 | 390 | 770 | 37 |
| 3 | 6.5 | 5 | 410 | 700 | 34 | 0.4 | 1.8 | 1 | 390 | 830 | 34 |
| 4 | 9.6 | 5 | 410 | 644 | 35 | 0.4 | 3 | 1 | 390 | 798 | 35 |

By applying the data in Tables 1-2 and FIGS. 1-4, it is possible to develop a manufacturing process window for making strengthened, antimicrobial glass articles. As demonstrated by Table 3 below, the KNO$_3$-containing molten salt bath can be configured with 0% to 4% NaNO$_3$ poisoning and the AgNO$_3$-containing molten salt bath can be configured with 0.25% to about 0.5% AgNO$_3$ and 0% to 2% NaNO$_3$ poisoning. Here, the glass articles used to develop the data in Table 3 had a composition similar to those employed to develop the data from Tables 1 and 2.

Referring to Table 3, IOX strengthening was performed in a KNO$_3$-containing molten salt bath at 410° C. for 5 hours. The composition of the KNO$_3$-containing molten salt bath was KNO$_3$-xNaNO$_3$ (by weight %), where x was set at 0% and 4% for each of the samples corresponding to a particular row in Table 3. Following ion-exchange strengthening, the glass articles were immersed in an AgNO$_3$-containing molten salt bath at 390° C. for 1 hour. The composition of AgNO$_3$-containing molten salt bath was KNO$_3$-xAgNO$_3$-yNaNO$_3$ (by weight %), where x and y were set at 0.25% and 1%, and 0.5% and 0%, respectively, for each of the samples corresponding to a particular row in Table 3.

Referring to Table 3, Ag consumption levels as a function of glass article surface area were measured in the DIOX-processed glass articles using conventional ICP analytical techniques. In addition, glass articles corresponding to each of the rows in Table 2, processed according to the specified conditions, were demonstrated to exhibit antimicrobial efficacy with log kill values>2 according to the protocol. In particular, these samples exhibited log kill values>2 in the concentration of at least *Staphylococcus aureus*, *Enterobacter aerogenes*, and *Pseudomonas aeruginosa* bacteria when tested according to the "dry test" protocol described herein and in U.S. Provisional Patent Application No. 61/908,401, which is hereby incorporated by reference in its entirety as if fully set forth below.

TABLE 3

| KNO$_3$-containing bath | | | AgNO$_3$-containing bath | | | | Ag consumption (ICP) | |
|---|---|---|---|---|---|---|---|---|
| NaNO$_3$ (wt %) | Time (hrs) | Temp (° C.) | AgNO$_3$ (wt %) | NaNO$_3$ (wt %) | Time (hrs) | Temp (° C.) | (wt %) | (g/ft$^2$) |
| 0 | 5 | 420 | 0.25 | 2 | 1 | 390 | 0.041 | 0.0503 |
| 4 | 5 | 420 | 0.5 | 0 | 1 | 390 | 0.14 | 0.1719 |

Still referring to Table 3, the glass articles processed in a KNO$_3$-containing molten salt bath containing 0% by weight NaNO$_3$, and an AgNO$_3$-containing molten salt bath containing 2% by weight NaNO$_3$, 0.25% by weight AgNO$_3$, and a balance of KNO$_3$ exhibited 0.0503 g/ft$^2$Ag consumption levels. As such, the process conditions in row 1 of Table 3 demonstrate that poisoning in the AgNO$_3$-containing molten salt bath tends to significantly reduce the Ag consumption level. Further, glass articles processed according to row 2 of Table 3 in a KNO$_3$-containing molten salt bath containing 4% by weight NaNO$_3$, and an AgNO$_3$-containing molten salt bath containing 0% by weight NaNO$_3$, 0.5% by weight AgNO$_3$, and a balance of KNO$_3$ exhibited 0.1719 g/ft$^2$Ag consumption levels. Here, the Ag consumption rate is significantly higher reflecting poisoning in the KNO$_3$-containing molten salt bath (which tends to maximize strength retention in the glass articles) and no poisoning in the AgNO$_3$-containing molten salt bath. The data in Table 3 (and also in FIGS. 1 and 2) thus suggest that relatively low levels of poisoning in the AgNO$_3$-containing molten salt bath (e.g., at levels of a few %) can significantly reduce Ag consumption with no detrimental effect on strength retention.

While the embodiments disclosed herein have been set forth for the purpose of illustration, the foregoing description should not be deemed to be a limitation on the scope of the disclosure or the appended claims. Accordingly, various modifications, adaptations and alternatives may occur to one skilled in the art without departing from the spirit and scope of the present disclosure or the appended claims.

What is claimed is:

1. A method of making an antimicrobial glass article, the method comprising:
providing a glass substrate;
contacting the glass substrate with a $KNO_3$-containing molten salt bath for about 30 minutes to about 24 hours to form a compressive stress layer, wherein the $KNO_3$-containing molten salt bath is set at a temperature of about 380° C. to about 460° C. and the compressive stress layer extends inward from a surface of the glass substrate to a first depth;
providing an AgNO3-containing molten salt bath set at a temperature of about 300° C. to about 400° C.;
poisoning the $AgNO_3$-containing molten salt bath with a poisoning ion, wherein the poisoning ion comprises $Li^+$, $Na^+$, or combinations thereof, and the poisoning ion is contained in an amount of greater than or equal to 1.8 wt % as determined on the basis of the nitrate form; and
contacting the glass substrate comprising the compressive stress layer with the poisoned $AgNO_3$-containing molten salt bath for about 5 minutes to about 18 hours to form an antimicrobial region, wherein the antimicrobial region extends inward from the surface of the glass substrate to a second depth.

2. The method of claim 1, wherein the poisoning step is configured to minimize Ag consumption during the step of contacting the substrate with the $AgNO_3$-containing molten salt bath.

3. The method of claim 2, wherein the poisoning step is configured to limit Ag consumption during the step of contacting the substrate with the $AgNO_3$-containing molten salt bath to about 0.18 $g/ft^2$ or less.

4. The method of claim 2, wherein the poisoning step is configured to limit Ag consumption during the step of contacting the substrate with the $AgNO_3$-containing molten salt bath to about 0.10 $g/ft^2$ or less.

5. The method of claim 1, wherein the $AgNO_3$-containing molten salt bath is set at a temperature of about 380° C. to about 400° C.

6. The method of claim 1, wherein the step of contacting the glass substrate comprising the compressive stress layer with the poisoned $AgNO_3$-containing molten salt bath is conducted for about 30 minutes to about 90 minutes.

7. The method of claim 1, wherein the $KNO_3$-containing molten salt bath is set at a temperature of about 400° C. to about 420° C. and the step of contacting the glass substrate with the $KNO_3$-containing molten salt bath is conducted for about 4 hours to about 6 hours.

8. The method of claim 1, wherein the poisoning step comprises poisoning the $AgNO_3$-containing molten salt bath with up to about 2.5% $NaNO_3$ by weight.

9. The method of claim 1, wherein the glass substrate comprising the compressive stress layer and the antimicrobial region exhibits at least a one log reduction when subjected to a dry antimicrobial test protocol employing one or more of *Staphylococcus aureus, Enterobacter aerogenes*, and *Pseudomonas aeruginosa* bacteria.

10. A method of making an antimicrobial glass article, the method comprising:
providing a glass substrate;
contacting the glass substrate with a KNO3-containing molten salt bath for about 30 minutes to about 24 hours to form a compressive stress layer, wherein the $KNO_3$-containing molten salt bath is set at a temperature of about 380° C. to about 460° C. and the compressive stress layer extends inward from a surface of the glass substrate to a first depth;
providing an AgNO3-containing molten salt bath set at a temperature of about 300° C. to about 400° C.;
poisoning the AgNO3-containing and the KNO3-containing molten salt baths, wherein poisoning the AgNO3-containing bath comprising poisoning with a poisoning ion comprises Li+, Na+ or combinations thereof and the poisoning ion is contained in an amount of greater than or equal to 1.8 wt % as determined on the basis of the nitrate form; and contacting the glass substrate comprising the compressive stress layer with the poisoned AgNO3-containing molten salt bath for about 5 minutes to about 18 hours to form an antimicrobial region, wherein the antimicrobial region extends inward from the surface of the glass substrate to a second depth.

11. The method of claim 10, wherein the poisoning step is configured to minimize Ag consumption during the step of contacting the substrate with the $AgNO_3$-containing molten salt bath.

12. The method of claim 11, wherein the poisoning step is configured to limit Ag consumption during the step of contacting the substrate with the $AgNO_3$-containing molten salt bath to about 0.18 $g/ft^2$ or less.

13. The method of claim 11, wherein the poisoning step is configured to limit Ag consumption during the step of contacting the substrate with the $AgNO_3$-containing molten salt bath to about 0.10 $g/ft^2$ or less.

14. The method of claim 10, wherein the $AgNO_3$-containing molten salt bath is set at a temperature of about 380° C. to about 400° C.

15. The method of claim 10, wherein the step of contacting the glass substrate comprising the compressive stress layer with the poisoned AgNO3-containing molten salt bath is conducted for about 30 minutes to about 90 minutes.

16. The method of claim 10, wherein the $KNO_3$-containing molten salt bath is set at a temperature of about 400° C. to about 420° C. and the step of contacting the glass substrate with the $KNO_3$-containing molten salt bath is conducted for about 4 hours to about 6 hours.

17. The method of claim 10, wherein the poisoning step comprises poisoning the $KNO_3$-containing molten salt bath with up to about 7% $NaNO_3$ by weight and the $AgNO_3$-containing molten salt bath with up to about 2.5% $NaNO_3$ by weight.

18. The method of claim 10, wherein the glass substrate comprising the compressive stress layer and the antimicrobial region exhibits at least one of:
at least a 2 log reduction in a concentration of at least *Staphylococcus aureus, Enterobacter aerogenes*, and *Pseudomomas aeruginosa* bacteria under JIS Z 2801 (2000) testing conditions;
at least a 3 log reduction in a concentration of at least *Staphylococcus aureus, Enterobacter aerogenes*, and *Pseudomomas aeruginosa* bacteria under modified JIS Z 2801 (2000) testing conditions, wherein the modified conditions comprise heating the antimicrobial glass article to a temperature of about 23 degrees Celsius to about 37 degrees Celsius at a humidity of about 38 percent to about 42 percent for about 24 hours followed by drying for about 6 hours to about 24 hours; and
at least a 2 log reduction in the concentration of at least *Staphylococcus aureus, Enterobacter aerogenes*, and *Pseudomonas aeruginosa* bacteria under a Dry Test.

19. A manufacturing method of making antimicrobial glass articles, the method comprising:
provide a first plurality of glass substrates;
contacting the first plurality of glass substrates with a poisoned KNO3-containing molten salt bath for about 30 minutes to about 24 hours to form a compressive stress layer, wherein the KNO3-containing molten salt bath is set at about 400° C. to about 420° C. and the compressive stress layer extends inward from a surface of the glass substrates to a first depth; and
contacting the first plurality of the glass substrates comprising the compressive stress layer with a poisoned AgNO3-containing molten salt bath, wherein poisoning the AgNO3-containing bath comprising poisoning with a poisoning ion comprises Li+, Na+ or combinations thereof and the poisoning ion is contained in an amount of greater than or equal to 1.8 wt % as determined on the basis of the nitrate form for about 5 minutes to about 18 hours to form an antimicrobial region, wherein the AgNO3-containing molten salt bath is set at about 380° C. to about 400° C. and the antimicrobial region extends inward from the surface of the glass substrates to a second depth.

20. The manufacturing method of claim 19, wherein the baths are poisoned to minimize Ag consumption during the step of contacting the first plurality of substrates with the AgNO$_3$-containing molten salt bath.

21. The manufacturing method of claim 20, wherein the baths are poisoned to limit Ag consumption during the step of contacting the first plurality of substrates with the AgNO$_3$-containing molten salt bath to about 0.18 g/ft$^2$ or less.

22. The manufacturing method of claim 20, wherein the baths are poisoned to limit Ag consumption during the step of contacting the first plurality of substrates with the AgNO$_3$-containing molten salt bath to about 0.10 g/ft$^2$ or less.

23. The manufacturing method of claim 19, further comprising:
providing a second plurality of glass substrates, wherein the contacting steps further comprise contacting the second plurality of glass substrates with the poisoned, KNO$_3$-containing and AgNO$_3$-containing molten salt baths after contacting the first plurality of glass substrates with the poisoned, KNO$_3$-containing and AgNO$_3$-containing molten salt baths.

24. The manufacturing method of claim 23, wherein the baths are poisoned to minimize Ag consumption during the step of contacting the first and second plurality of substrates with the AgNO$_3$-containing molten salt baths.

25. The manufacturing method of claim 23, wherein the baths are poisoned with NaNO$_3$, and the AgNO$_3$-containing molten salt bath is poisoned with up to 2.5% NaNO$_3$ by weight.

26. The manufacturing method of claim 23, wherein the baths are poisoned to limit Ag consumption during the step of contacting the first and second plurality of substrates with the AgNO$_3$-containing molten salt bath to about 0.18 g/ft$^2$ or less.

27. The manufacturing method of claim 23, wherein the baths are poisoned to limit Ag consumption during the step of contacting the first and second plurality of substrates with the AgNO$_3$-containing molten salt bath to about 0.10 g/ft$^2$ or less.

28. The manufacturing method of claim 19, wherein the glass substrates comprising the compressive stress layer and the antimicrobial region exhibit at least a one log reduction when subjected to a dry antimicrobial test protocol employing one or more of *Staphylococcus aureus*, *Enterobacter aerogenes*, and *Pseudomonas aeruginosa* bacteria.

* * * * *

UNITED STATES PATENT AND TRADEMARK OFFICE
CERTIFICATE OF CORRECTION

PATENT NO. : 10,683,234 B2
APPLICATION NO. : 15/305150
DATED : June 16, 2020
INVENTOR(S) : Ekaterina Aleksandrovna Kuksenkova et al.

It is certified that error appears in the above-identified patent and that said Letters Patent is hereby corrected as shown below:

In the Claims

In Column 21, Line 64, Claim 10, delete "KNO3-" and insert -- $KNO_3$- --, therefor.

In Column 21, Line 66, Claim 10, delete "KNO3-" and insert -- $KNO_3$- --, therefor.

In Column 22, Line 4, Claim 10, delete "AgNO3-" and insert -- $AgNO_3$- --, therefor.

In Column 22, Line 6, Claim 10, delete "AgNO3-" and insert -- $AgNO_3$- --, therefor.

In Column 22, Line 6, Claim 10, delete "KNO3-" and insert -- $KNO_3$- --, therefor.

In Column 22, Line 7, Claim 10, delete "AgNO3-" and insert -- $AgNO_3$- --, therefor.

In Column 22, Line 15, Claim 10, delete "AgNO3-" and insert -- $AgNO_3$- --, therefor.

In Column 22, Line 37, Claim 15, delete "AgNO3-" and insert -- $AgNO_3$- --, therefor.

In Column 22, Line 54, Claim 18, delete "Pseudomomas" and insert -- Pseudomonas --, therefor.

In Column 22, Line 58, Claim 18, delete "Pseudomomas" and insert -- Pseudomonas --, therefor.

In Column 22, Line 67, Claim 18, delete "Pseudomomas" and insert -- Pseudomonas --, therefor.

In Column 23, Line 5, Claim 19, delete "KNO3-" and insert -- $KNO_3$- --, therefor.

In Column 23, Line 7, Claim 19, delete "KNO3-" and insert -- $KNO_3$- --, therefor.

In Column 23, Line 13, Claim 19, delete "AgNO3-" and insert -- $AgNO_3$- --, therefor.

Signed and Sealed this
Tenth Day of September, 2024

*Katherine Kelly Vidal*

Katherine Kelly Vidal
*Director of the United States Patent and Trademark Office*

In Column 23, Line 14, Claim 19, delete "AgNO3-" and insert -- AgNO$_3$- --, therefor.

In Column 23, Line 19, Claim 19, delete "AgNO3-" and insert -- AgNO$_3$- --, therefor.